United States Patent
Hwang et al.

(10) Patent No.: US 7,660,133 B1
(45) Date of Patent: Feb. 9, 2010

(54) RESONANT SWITCHING CONVERTER HAVING OPERATING MODES ABOVE AND BELOW RESONANT FREQUENCY

(75) Inventors: Jeffrey Hwang, Saratoga, CA (US); Alland Chee, Union City, CA (US)

(73) Assignee: Champion Microelectronic Corporation (TW)

( * ) Notice: Subject to any disclaimer, the term of this patent is extended or adjusted under 35 U.S.C. 154(b) by 0 days.

(21) Appl. No.: 12/290,853

(22) Filed: Nov. 4, 2008

(51) Int. Cl.
*H02M 3/335* (2006.01)

(52) U.S. Cl. .......................................... 363/16
(58) Field of Classification Search .................. 363/16, 363/131, 15, 13
See application file for complete search history.

(56) References Cited

U.S. PATENT DOCUMENTS 6,657,417 B1   12/2003  Hwang
7,518,263 B2 *  4/2009  Gan et al. ................. 307/32
2004/0174152 A1  9/2004  Hwang et al.
2009/0034298 A1  2/2009  Liu et al.

FOREIGN PATENT DOCUMENTS

TW         200743295        11/2007

* cited by examiner

*Primary Examiner*—Shawn Riley
(74) *Attorney, Agent, or Firm*—Westberg Law Offices

(57) ABSTRACT

A resonant switching converter comprises a resonant tank having a resonant frequency; a synchronous rectifier coupled to the resonant tank, the synchronous rectifier drawing power from the resonant tank for forming an output voltage; and a controller coupled to the synchronous rectifier for controlling switching of the synchronous rectifier using frequency modulation. The controller operates in a first mode in which the switching of the synchronous rectifier is performed above the resonant frequency of the resonant tank. The first mode employs a duty cycle for the synchronous rectifier. In addition, the controller operates in a second mode in which the switching of the synchronous rectifier is performed below the resonant frequency and the duty cycle of the synchronous rectifier in the second mode is reduced from that of the first mode.

20 Claims, 6 Drawing Sheets

RESONANT SWITCHING CONVERTER HAVING OPERATING MODES ABOVE AND BELOW RESONANT FREQUENCY

FIELD OF THE INVENTION

The present invention relates to the field of power supplies. More particularly, the present invention relates to the field of resonant switching power converters.

BACKGROUND OF THE INVENTION

An off-line power supply receives power from an alternating-current (AC) source and provides a voltage-regulated, direct-current (DC) output that can be used to power a load. An exemplary off-line power supply includes a power factor correction (PFC) stage and a DC-to-DC converter stage. The PFC stage receives the AC input signal, performs rectification and maintains current drawn from the AC source substantially in phase with the AC voltage so that the power supply appears as a resistive load to the AC source. The DC-to-DC converter stage receives the rectified output of the PFC stage and generates the voltage-regulated, DC output which can be used to power the load. The rectified output of the PFC stage is typically at higher voltage and is more loosely regulated than the output of the DC-to-DC stage.

An exemplary DC-to-DC converter includes a series resonant circuit (SRC) topology. In this configuration, an inductor and a capacitor are connected in series to form a resonant tank. A switching inverter charges the resonant tank with energy. A load receives power from the resonant tank.

Adjusting the switching frequency of the inverter changes the impedance of the resonant tank, and because the resonant tank is in series with the load, this changes the power delivered to the load. The switching frequency can be adjusted to maintain the DC output voltage constant.

It is desired to provide an improved DC-to-DC converter. It is also desired to provide a DC-to-DC converter having high efficiency.

SUMMARY OF THE INVENTION

The present invention is directed toward a resonant switching converter, to a controller for resonant switching converter and to a method of controlling a resonant switching converter. In an embodiment, a resonant switching converter comprises: a resonant tank having a resonant frequency; a synchronous rectifier coupled to the resonant tank, the synchronous rectifier drawing power from the resonant tank for forming an output voltage; and a controller coupled to the synchronous rectifier for controlling switching of the synchronous rectifier using frequency modulation. The controller operates in a first mode in which the switching of the synchronous rectifier is performed above the resonant frequency of the resonant tank. The first mode employs a duty cycle for the synchronous rectifier. In addition, the controller operates in a second mode in which the switching of the synchronous rectifier is performed below the resonant frequency and the duty cycle of the synchronous rectifier in the second mode is reduced from that of the first mode.

BRIEF DESCRIPTION OF THE DRAWINGS

The present invention is described with respect to particular exemplary embodiments thereof and reference is accordingly made to the drawings in which.

DETAILED DESCRIPTION OF THE INVENTION

The present invention is directed toward a resonant switching converter, to a controller for resonant switching converter and to a method of controlling a resonant switching converter. The present invention allows a resonant switching converter to operate safely and predictably at frequencies above and below the resonant frequency of a resonant tank circuit. This allows the resonant switching converter to operate efficiently despite changes in to an input voltage provided to the resonant switching converter.

Figure 1:
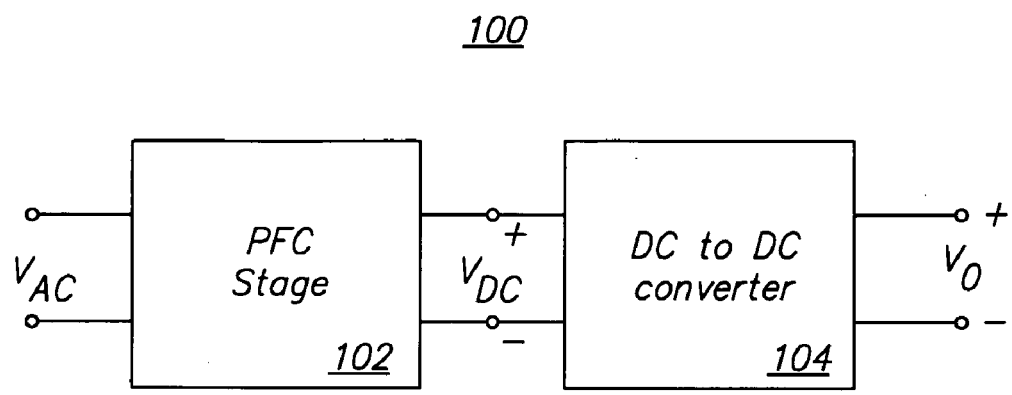
FIG. 1 illustrates a block schematic diagram of a two-stage, off-line power supply in accordance with an embodiment of the present invention.

FIG. 1 illustrates a block schematic diagram of a two-stage, off-line power supply 100 in accordance with an embodiment of the present invention. As shown in FIG. 1, a power factor correction (PFC) stage 102 has an input coupled to alternating-current (AC) source. The PFC stage 102 performs rectification on the AC input signal and maintains current drawn from the AC source substantially in phase with the AC voltage so that the power supply 100 appears as a resistive load to the AC source.

The PFC stage 102 generates a loosely regulated voltage, $V_{DC}$, which is provided as input to a DC-to-DC converter 104. Using the input $V_{DC}$, the DC-to-DC converter stage 104 generates a voltage-regulated, DC output, $V_O$, which can be used to power a load. The level of $V_{DC}$ is preferably at a higher voltage and is more loosely regulated than the output $V_O$ of the DC-to-DC converter stage 104. The nominal level of the output, $V_{DC}$, of the PFC stage 102 may be, for example, approximately 380 volts DC, while the voltage-regulated output $V_O$ of the DC-to-DC converter stage 104 may be, for example, approximately 12.0 volts DC. However, due to changes in the AC source, the output $V_{DC}$ of the PFC stage 102 may, at times, fall below its nominal level.

Figure 2:
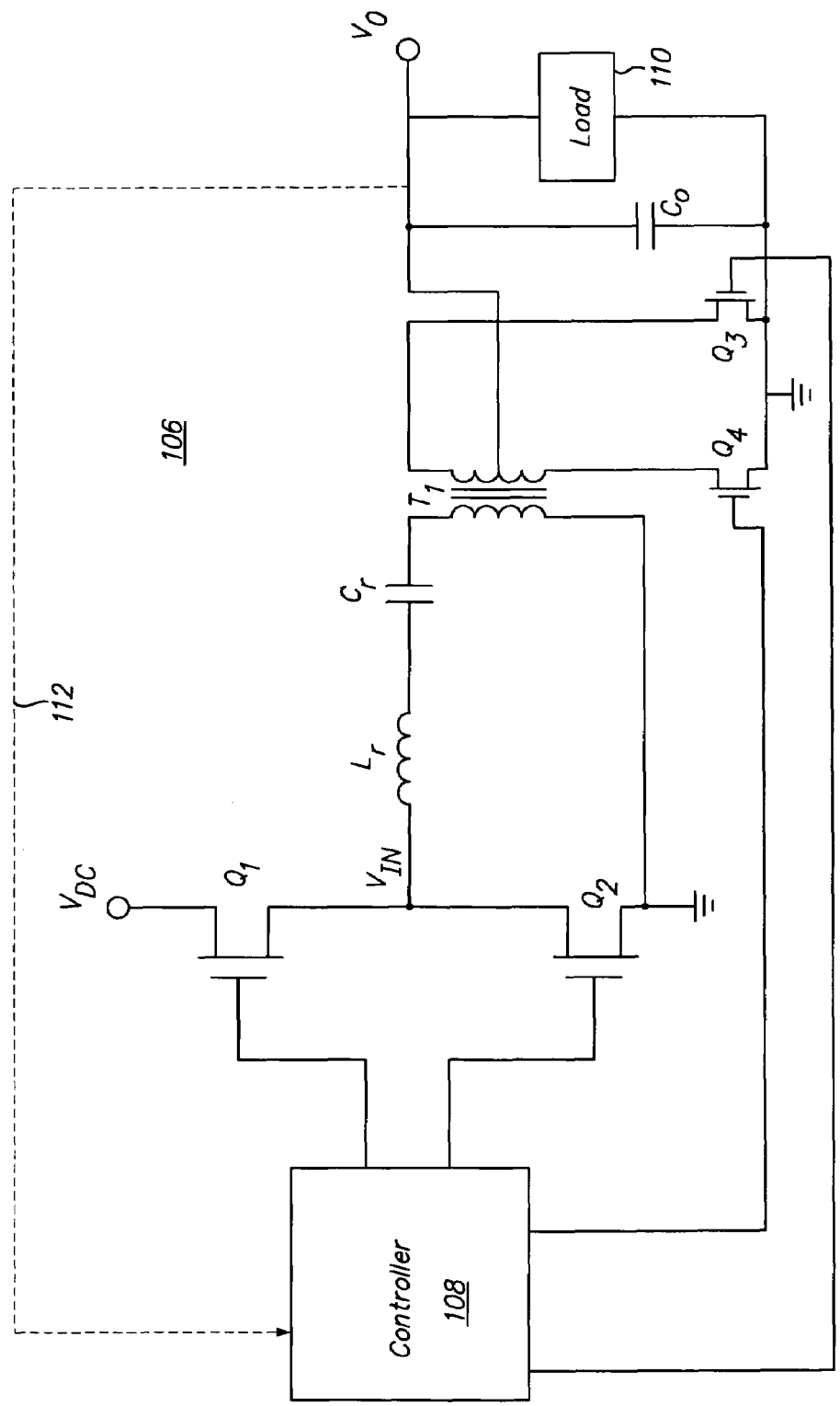
FIG. 2 illustrates a schematic diagram of a resonant switching converter in accordance with an embodiment of the present invention.

FIG. 2 illustrates a schematic diagram of a resonant switching converter 106 in accordance with an embodiment of the present invention. The resonant switching converter 106 may be, for example, included in the DC-to-DC converter 104 of FIG. 1. Referring to FIG. 2, the converter 106 includes a half-bridge switching inverter that includes a pair of series-connected transistor switches $Q_1$ and $Q_2$. A power source, such as the output $V_{DC}$ generated by the PFC stage 102 (FIG. 1), is coupled to a first terminal of the transistor switch $Q_1$. A second terminal of the transistor switch $Q_1$ is coupled to a first terminal of a transistor switch $Q_2$ to form an intermediate node. The second terminal of the transistor switch $Q_2$ is coupled to a ground node. A control terminal of each of the transistor switches $Q_1$ and $Q_2$ is coupled to a controller 108. The controller 108 controls opening and closing of the pair of transistor switches $Q_1$ and $Q_2$. When the switch $Q_1$ is closed and the switch $Q_2$ is open, the intermediate node is coupled to $V_{DC}$. This raises a voltage, VIN, at the intermediate node. When the switch $Q_1$ is open and the switch $Q_2$ is closed, the intermediate node is coupled to ground. This lowers the voltage, VIN, at the intermediate node. While FIG. 2 shows a half-bridge switching inverter, it can be replaced with a full-bridge switching inverter.

Energy storage elements are coupled to the intermediate node. Particularly, as shown in FIG. 2, a first terminal of an inductor $L_r$ is coupled to the intermediate node. A second terminal of the inductor $L_r$ is coupled to a first terminal of a capacitor $C_r$. The energy storage elements, $L_r$ and $C_r$, form a series resonant tank. The resonant tank is charged with energy by raising and lowering the voltage VIN at the intermediate node. A second terminal of the capacitor $C_r$ is coupled to a first terminal of a primary winding of a transformer $T_1$. A second terminal of the primary winding of the transformer $T_1$ is coupled to a ground node. A first terminal of a secondary winding of the transformer $T_1$ is coupled to a first terminal of a transistor switch $Q_3$. A second terminal of the secondary winding of the transformer $T_1$ is coupled to a first terminal of a transistor switch $Q_4$. A second terminal of the transistor switch $Q_3$ and a second terminal of the transistor switch $Q_4$ are coupled to a ground node. A control terminal of each of the transistor switches $Q_3$ and $Q_4$ is coupled to the controller 108. The controller 108 controls opening and closing of the pair of transistor switches $Q_3$ and $Q_4$.

A center tap of the secondary winding of the transformer $T_1$ is coupled to a first terminal of a capacitor $C_O$. A second terminal of the capacitor $C_O$ is coupled to a ground node. An output voltage, $V_O$, is formed across the capacitor $C_O$. A load 110 may be coupled across the capacitor $C_O$ to receive the output voltage $V_O$. The output voltage $V_O$, or a voltage that is representative of the output voltage, is fed back to the controller 108 via a feedback path 112.

Adjusting the switching frequency of the transistor switches $Q_1$ and $Q_2$ adjusts impedance of the resonant tank and, therefore, adjusts the amount of power delivered to the load 110. More particularly, decreasing the switching frequency tends to increase the power delivered to the load 110. Increasing the switching frequency tends to reduce the power delivered to the load 110. By monitoring the level of the output voltage $V_O$ via a feedback path 112, the controller 108 can adjust the switching frequency to maintain the output voltage $V_O$ constant despite changes in the power requirements of the load 110 and despite changes in the level of the input $V_{DC}$. This is referred to as frequency modulation or FM modulation.

As power is transferred to the load 110 via the transformer $T_1$, current through the secondary winding of the transformer $T_1$ alternates in direction. The transistor switches $Q_3$ and $Q_4$ perform synchronous rectification. This is accomplished by the controller 108 turning the transistor switches $Q_3$ and $Q_4$ on and off at appropriate times so that the current through each of the switches $Q_3$ and $Q_4$ is in one direction only. Generally, the transistor switch $Q_3$ is on while the transistor switch $Q_4$ is off. Similarly, the transistor switch $Q_4$ is on while the transistor switch $Q_3$ is off. Synchronous rectification ensures that power is delivered to the load 110 and prevents reverse currents which could be reflected to the resonant tank. Such reverse current could result in unwanted oscillations, intractable behavior and device failure.

Figure 3:
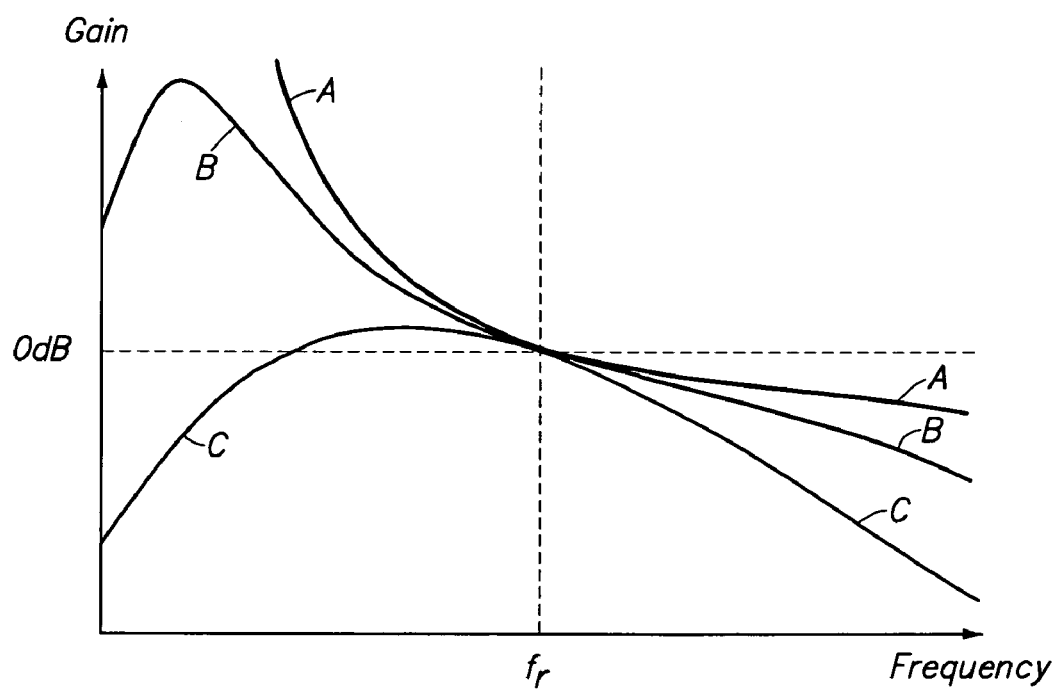
FIG. 3 illustrates a graph showing simulated gain vs. frequency for a resonant switching converter in accordance with an embodiment of the present invention.

FIG. 3 illustrates a graph showing simulated gain vs. frequency for the series resonant switching converter 106 in accordance with an embodiment of the present invention. As shown in FIG. 3, frequency is represented by the horizontal axis, increasing from left to right, and gain is represented by the vertical axis, increasing from bottom to top. A series of gain curves A, B and C, are shown. The curve C represents a nominal, "full load," while the curve B represents a loading of approximately fifty percent (50%) of the full load, and the curve A represents a loading of approximately twenty percent (20%) of the full load.

The maximum gain of the resonant switching converter 106 is 1.0 (or 0 dB), which is achieved at the resonant frequency of the resonant tank. The resonant frequency may be computed as:

$$fr = \frac{1}{2\pi\sqrt{LrCr}}.$$

The inventive resonant switching converter 106 can be operated at frequencies above and at frequencies below the resonant frequency of the resonant tank. More particularly, at frequencies above the resonant frequency, the controller 108 operates in a frequency modulation (FM) mode in which the transistor switches $Q_1$, $Q_2$, $Q_3$ and $Q_4$ are operated at the same switching frequency as each other using frequency modulation. The frequency is modulated to control the power delivered to the load 110 and to maintain the load voltage $V_O$ constant using feedback (e.g. via the feedback path 112). Also, in this mode, the transistor switches $Q_1$, $Q_2$, $Q_3$ and $Q_4$ are all preferably operated at substantially a fifty percent (50%) duty cycle. For each switching cycle of a fifty-percent duty cycle, the on-time of each transistor switch is one-half of the switching period. In practice, the maximum duty cycle may be just under fifty percent (50%) in order to avoid shoot-through in which one of the transistor switches of a pair has not yet turned off before the other one is turned on. The above-described FM mode of operation may be employed when the input voltage, $V_{DC}$, is near its nominal level and the load 110 is drawing at or near maximum power of the switching converter (also referred to as being at "full load").

In the event of a change in the level of the voltage, $V_{DC}$, supplied to the switching converter 106, the switching frequency is changed in order to maintain a constant output voltage $V_O$. For example, the level of $V_{DC}$ may fall due to an interruption or lowering of the level of the AC supply or if the AC source is disconnected. In this case, the switching frequency needs to be lowered in order to compensate. If, by using frequency modulation, the switching frequency falls below the resonant frequency of the resonant tank, the controller 108 transitions to a mode in which the duty cycle of the transistor switches $Q_3$ and $Q_4$, that perform synchronous rectification on the secondary side of the transformer $T_1$, is reduced.

More particularly, at frequencies below the resonant frequency, the controller 108 may employ pulse-width modulation (PWM) to control switching in addition to the frequency modulation described above. In this second mode of operation, the duty-cycle (i.e. the portion of each switching cycle that each transistor switch is on) for the transistor switches $Q_3$ and $Q_4$ is reduced when the switching frequency is below the resonant frequency. Also in this mode, the transistor switches $Q_1$, $Q_2$, $Q_3$ and $Q_4$ are preferably operated at the same switching frequency as each other using frequency modulation. In this mode, the transistor switches $Q_1$ and $Q_2$, are preferably operated at substantially a fifty percent (50%) duty cycle. However, for the transistor switches $Q_3$ and $Q_4$, the duty cycle is preferably adjusted by an amount that is related to the switching frequency. More particularly, as the switching frequency is reduced, the duty cycle for the transistor switches $Q_3$ and $Q_4$ is reduced. Conversely, as the switching frequency is increased, the duty cycle for the transistor switches $Q_3$ and $Q_4$ is increased. Should the switching frequency be increased to the point that it returns to a level above the resonant frequency, then the duty cycle of the transistor switches $Q_3$ and $Q_4$ is returned to fifty percent (50%) and the controller 108 returns to the FM modulation mode in which all of the transistor switches $Q_1$, $Q_2$, $Q_3$ and $Q_4$ are operated at the same duty cycle and frequency as each other.

Reducing the duty cycle of the switches $Q_3$ and $Q_4$ at these lower switching frequencies tends to prevent reverse current in the transistor switches $Q_3$ and $Q_4$. This, in turn, tends to prevent the reverse currents from being reflected to the primary side of the transformer $T_1$ where they may interfere with operation of the resonant tank (e.g. by causing in unwanted oscillations, intractable behavior and device failure). In addition, the reduced duty cycle of the switches $Q_3$ and $Q_4$ allows the converter to operate for a longer period of time at a reduced input level. Therefore, the hold-up time requirements (i.e. the amount of time that the converter output remains within tolerance after the input power source is disconnected) are more-easily met. This means that a capacitor at the input of the converter (across which the voltage $V_{DC}$ is generated) can be smaller than otherwise. In addition, the transformer $T_1$ can also be smaller than otherwise.

In an embodiment, the duty cycle of the switches $Q_3$ and $Q_4$ is reduced so that the on-time of each of the transistor switches $Q_3$ and $Q_4$ remains substantially constant and equal to one-half the switching period at the resonant frequency. Therefore, the on-time may be given as:

$$\text{on-time} = \frac{1}{2f_r}.$$

The on-time is the duration of time that each switch is on during one switching cycle. As the switching frequency is reduced, the switching period is increased. This is because the period is inversely related to the frequency. Therefore, because the on-time remains constant, the off-time (i.e. the remainder of the switching period) is increased. In another embodiment, the on-time may be less than one-half the switching period at the resonant frequency; in this case, the on-time may also be substantially constant.

Rather than adjusting the duty cycle for the transistor switches $Q_3$ and $Q_4$ based on the switching frequency as described above, the current through the transistors $Q_3$ and $Q_4$ may be sensed when the switching is below the resonant frequency. For example, the voltage across a resistor placed in series with each of the transistor switches $Q_3$ and $Q_4$ may be sensed. When the current falls to zero or near zero, this indicates that the corresponding transistor should be turned off to prevent the current from falling below zero (i.e. reversing direction). While this current-sensing embodiment is expected to be feasible, it is less preferred since sensing the current tends to increase complexity of the converter and uses power (e.g. in the sensing resistors) which tends to reduce efficiency.

As explained above in connection with the FM modulation mode, if changes in the load 110 cause it to draw less power, the switching frequency of the transistor switches $Q_1$, $Q_2$, $Q_3$ and $Q_4$ is increased in order to maintain a constant level for the output voltage $V_O$. Increasing the switching frequency, however, can reduce efficiency since switching losses (e.g. power required to turn the switching transistors on and off) tend to increase in relation to other losses. Therefore, in order to increase efficiency under light load conditions, the controller 108 may enter a third mode of operation in which the duty cycle of all of the switches $Q_1$, $Q_2$, $Q_3$ and $Q_4$ is reduced while keeping the duty cycle of each switch the same as each others. This mode is entered when the switching frequency reaches a specified frequency level. In this mode, FM modulation and PWM are used to control switching. More particularly, as the power requirements of the load 110 are reduced, the switching frequency of the switches $Q_1$, $Q_2$, $Q_3$ and $Q_4$ is increased in accordance with FM modulation and, simultaneously, the duty cycle of the switches $Q_1$, $Q_2$, $Q_3$ and $Q_4$ is reduced in accordance with PWM modulation. The amount by which the duty cycle is reduced may be related to the level of the switching frequency. Alternatively, when the switching frequency rises above the specified frequency level, the duty cycle may be changed to a specified value below fifty percent (50%). This mode of operation is described in more detail in U.S. patent application Ser. No. 11/830,738, filed on Jul. 30, 2007, the entire contents of which are hereby incorporated by reference.

Figure 4:
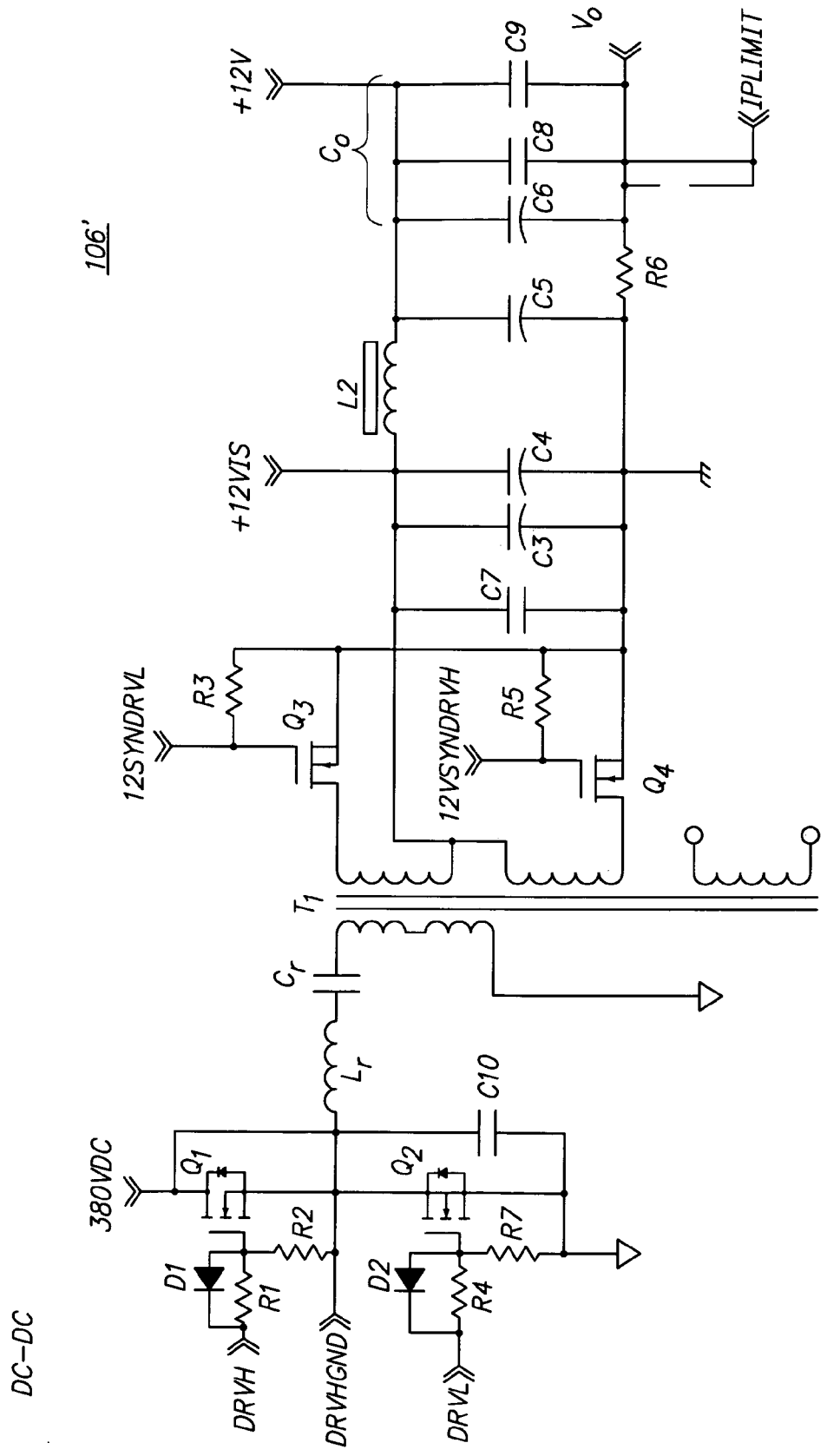
FIG. 4 illustrates a schematic diagram of a resonant switching converter in accordance with an embodiment of the present invention.

FIG. 4 illustrates a schematic diagram of a resonant switching converter 106' in accordance with an embodiment of the present invention. The switching converter 106' of FIG. 4 operates in essentially the same manner as the switching converter 106 illustrated in FIG. 2, though FIG. 4 shows additional details not shown in FIG. 2. Like reference numerals are used in FIG. 4 for elements having a functional correspondence with elements of FIG. 2. Thus, FIG. 4 shows that the transistor switches $Q_1$ and $Q_2$ form the half-bridge inverter. In addition, inductor $L_r$ and capacitor $C_r$ form the resonant tank. The half-bridge inverter is coupled to the resonant tank which is, in turn, coupled to the primary side of the transformer $T_1$. Switches $Q_3$ and $Q_4$ are coupled to the secondary side of the transformer $T_1$ and perform synchronous rectification. The regulated output voltage $V_O$ is formed across capacitor $C_O$. As shown in FIG. 4, the capacitor $C_O$ comprises capacitors $C_6$, $C_8$ and $C_9$. It will be apparent that the switching converter 106' of FIG. 4 is exemplary and that alterations can be made. For example, a different resonant tank configuration, such as a parallel resonant tank, may be employed. Also, rather, than a half-bridge inverter, a full-bridge inverter may be employed.

Figure 5:
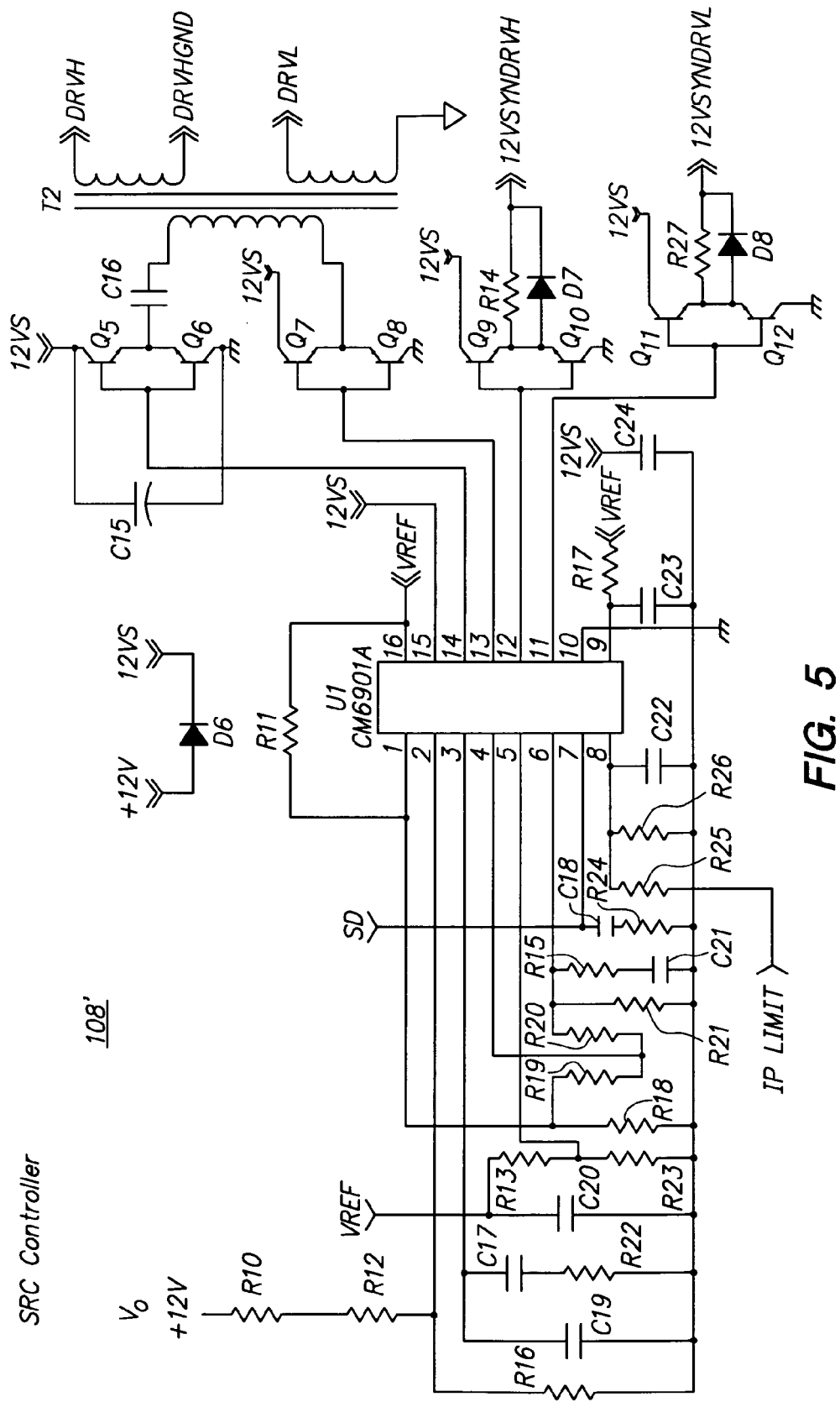
FIG. 5 illustrates a block schematic diagram of a controller for a resonant switching converter in accordance with an embodiment of the present invention.

FIG. 5 illustrates a block schematic diagram of a controller 108' for a resonant switching converter in accordance with an embodiment of the present invention. The controller 108' of FIG. 5 operates as described above in connection with the controller 108 shown in FIG. 2 to control the transistor switches $Q_1$, $Q_2$, $Q_3$ and $Q_4$. More particularly, as shown in FIGS. 4 and 5, a signal DRVH is generated by the controller 108' and used to drive the transistor switch Q1. Similarly, a signal DRVL is generated by the controller 108' and used to drive the transistor switch Q2. A signal 12VSYNDRVL is generated by the controller 108' and used to drive the transistor switch Q3. In addition, a signal 12VSYNDRVH is generated by the controller 108' and used to drive the transistor switch Q4. As shown in FIG. 5, transistors $Q_5$, $Q_6$, $Q_7$ and $Q_8$, along with a transformer $T_2$ generate drive signals for the transistor switches $Q_1$ and $Q_2$. Transistors $Q_9$, $Q_{10}$, $Q_{11}$ and $Q_{12}$ generate drive signals for the transistor switches $Q_1$ and $Q_2$.

Figure 6:
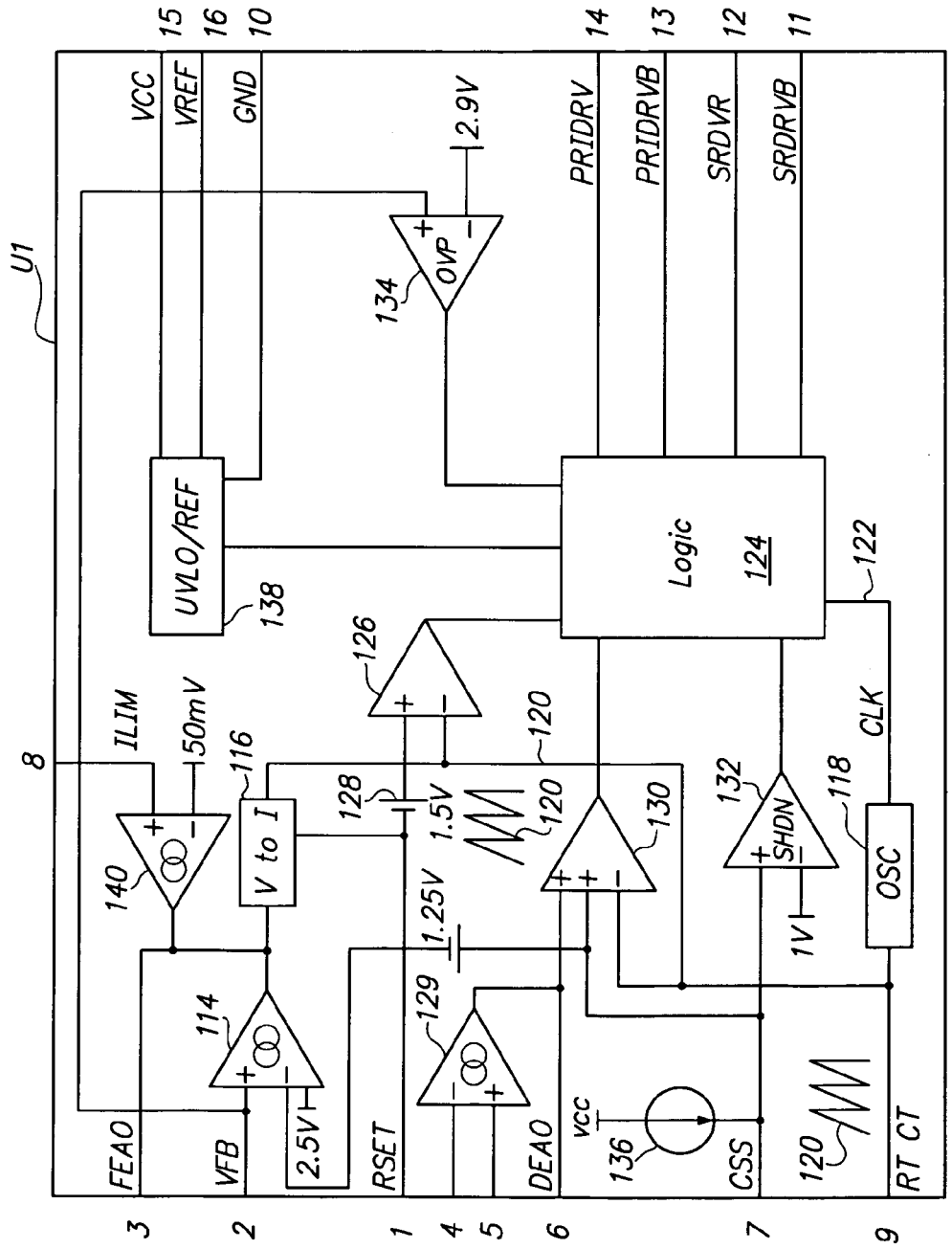
FIG. 6 illustrates a block schematic diagram of a controller integrated circuit for a resonant switching converter in accordance with an embodiment of the present invention.

In a preferred embodiment, the controller 108' includes a controller integrated circuit $U_1$. FIG. 6 illustrates a block schematic diagram of the controller integrated circuit $U_1$ for the resonant switching converter 106' and controller 108' in accordance with an embodiment of the present invention. The integrated circuit $U_1$ may be obtained under part number CM6901A through Champion Microelectronic Corporation, whose address is 5F, No. 11, Park Ave. II, Hsinchu Science-Based Industrial Park, Hsinchu City, Taiwan.

Referring to FIGS. 4, 5 and 6, opening and closing of each of the switches $Q_1$, $Q_2$, $Q_3$ and $Q_4$ is controlled by the controller 108', as described above, to form the output voltage $V_O$. The output, $V_O$, is coupled to a resistive divider comprising resistors $R_{10}$, $R_{12}$ and $R_{16}$ (FIG. 5) to form a feedback signal VFB that is representative of the level of the output voltage $V_O$. The feedback signal VFB is provided to the integrated circuit $U_1$ (FIG. 6). Within the integrated circuit $U_1$, the signal VFB is coupled to a first input of an amplifier 114. The amplifier 114 compares the signal VFB to a reference voltage, which may be for example, 2.5 volts, to form an error signal FEAO at its output. The error signal FEAO is representative of a difference between the output voltage $V_O$ and a desired level of the output voltage. The error signal FEAO is applied to a voltage-to-current converter 116. A first output of the voltage-to-current converter 116 is coupled to an oscillator 118. The oscillator 118 generates a ramp signal 120 and a clock signal 122.

The clock signal 122 is coupled to a logic block 124 which generates drive signals that control switching of the transistor switches $Q_1$, $Q_2$, $Q_3$ and $Q_4$. In the FM modulation mode, the logic block 124 generates the drive signals such that they have a fifty percent (50%) duty cycle. This may be accomplished, for example, by employing toggle flip-flips within the logic block 124 that are controlled by the clock signal 122 as well as other logic devices, such as logic gates.

Referring to FIG. 5, a first terminal of a resistor $R_{17}$ is coupled to a reference voltage source VREF. A second terminal of the resistor $R_{17}$ is coupled to a first terminal of a capacitor $C_{20}$ and to an RTCT pin of the integrated circuit $U_1$. A second terminal of the capacitor $C_{20}$ is coupled to a ground node. The values of $R_{17}$ and $C_{20}$ determine the nominal frequency of the ramp signal 120 generated by the oscillator 118.

FM modulation is accomplished as follows: When the output voltage $V_O$ rises with respect to a desired level for the output voltage, this causes the error signal FEAO to rise. In response, the output current level of the voltage-to-current converter 116 is increased. This tends to charge the capacitor $C_{20}$ more quickly which increases the slope of the ramp signal 120 and also increases its frequency. As a result, the frequency of the clock signal 122 generated by the oscillator 118 is also increased. Therefore, this increases the switching frequency of the transistor switches $Q_1$, $Q_2$, $Q_3$ and $Q_4$. Conversely, when the output voltage $V_O$ falls with respect to a desired level for the output voltage, this causes the error signal FEAO to fall. In response, the output current level of the voltage-to-current converter 116 is reduced. This tends to charge the capacitor $C_{20}$ more slowly which decreases the slope of the ramp signal 120 and also reduces its frequency. As a result, the frequency of the clock signal 122 generated by the oscillator 118 is also reduced. Therefore, this reduces the switching frequency of the transistor switches $Q_1$, $Q_2$, $Q_3$ and $Q_4$. In this manner, the switching frequency of the transistor switches $Q_1$, $Q_2$, $Q_3$ and $Q_4$ is raised or lowered according to the level of the output voltage $V_O$. Accordingly, these elements form a feedback loop in which FM modulation is used to adjust the switching frequency of the transistor switches $Q_1$, $Q_2$, $Q_3$ and $Q_4$ to maintain the output voltage $V_O$ constant.

The ramp signal 120 is also applied to an inverting input of a comparator 126. A non-inverting input of the comparator 126 is coupled to receive a signal RSET, which is offset by a 1.5 volt DC offset generator 128. An output of the comparator 126 is coupled to the logic block 124. The signal, RSET, is formed by voltage divider comprising resistors $R_{11}$ and $R_{18}$ (FIG. 5) coupled to the reference voltage VREF. A second output of the voltage-to-current converter 116 is coupled to the voltage divider. When the level of the error signal FEAO rises, this increases the current generated by the voltage-to-current converter 116. As a result, the level of RSET rises. Conversely, when the level of the error signal FEAO falls, this reduces the current generated by the voltage-to-current converter 116. A result, the level of RSET falls. Therefore, the level of RSET is related to the level of FEAO and, thus, the level of RSET is also related to the switching frequency of the transistor switches $Q_1$, $Q_2$, $Q_3$ and $Q_4$.

When the level of RSET is above 1.5 volts, the non-inverting input of the comparator 126 is greater than 3.0 volts. This is because the voltage offset generator 128 adds 1.5 volts to the level of RSET. Under these conditions, the output of the comparator 126 remains high and has no effect on the switching duty cycle. When the level of RSET is at approximately 1.5 volts, this corresponds to the transistor switches $Q_1$, $Q_2$, $Q_3$ and $Q_4$ operating at the resonant frequency of the resonant tank. Thus, when the switching frequency of the transistor switches $Q_1$, $Q_2$, $Q_3$ and $Q_4$ falls below the resonant frequency, the level of RSET falls below 1.5 volts and the non-inverting input of the comparator 126 falls below 3.0 volts. When this happens, the level at the non-inverting input of the comparator 126 is below the peak level of the ramp signal 120. As a result, the output of the comparator 126 toggles for each switching cycle. In addition, the pulse width at the output of the comparator 126 is related to the amount by which the switching frequency falls below the resonant frequency. This signal causes the logic block 124 to reduce the switching duty cycle of the transistor switches $Q_3$ and $Q_4$ that perform synchronous rectification by an amount that is related to the switching frequency. As explained above, the duty cycle of the transistor switches $Q_1$ and $Q_2$ preferably remains at fifty percent (50%) despite the reduced duty cycle of transistor switches $Q_3$ and $Q_4$.

To summarize, the level of RSET changes in response to the level of the second output of the voltage-to-current converter 116, which is controlled in response to the level of the error signal FEAO. When the level of the error signal FEAO causes the switching frequency to fall below the resonant frequency, this also causes the level of RSET to fall below 1.5 volts. When this occurs, the controller enters the second mode of operation, as described above, in which the switching duty cycle of the transistor switches $Q_3$ and $Q_4$ is reduced.

A non-inverting input of an amplifier 129 is coupled to a voltage divider that comprises resistors $R_{13}$ and $R_{23}$ (FIG. 5). More particularly, a reference voltage VREF is coupled to a first terminal of the resistor $R_{13}$. A second terminal of the resistor $R_{13}$ is coupled to a first terminal of the resistor $R_{23}$ and to the non-inverting input of the amplifier 129. A second terminal of the resistor $R_{23}$ is coupled to a ground node. Accordingly, the non-inverting input of an amplifier 129 is held at a fixed voltage level which may be, for example, 3.0 volts. An inverting input of the amplifier 129 is coupled to RSET through a resistor $R_{19}$ (FIG. 5). An output of the amplifier 129 is coupled to its inverting input through a resistor $R_{20}$ (FIG. 5). A signal DEAO is formed at the output of the amplifier 129. The signal DEAO is coupled to a non-inverting input of a comparator 130. An inverting input of the comparator is coupled to receive the ramp signal 120.

While the level of RSET is below a specified level, the level of DEAO is above 3.0 volts. This causes the output of the comparator 130 to remain high because the ramp signal 120 does not exceed 3.0 volts. Under these conditions, the comparator 130 has no effect on the duty cycle of the transistor switches $Q_1$, $Q_2$, $Q_3$ and $Q_4$. However, under light load conditions, the level of $V_O$ tends to rise, as does the level of RSET. When the level of RSET rises above the specified level, the level of DEAO falls below 3.0 volts by an amount that is related to the level of RSET. The comparator 130 now compares the ramp signal 120 to a level that is below 3.0 volts. As a result, the output of the comparator 130 toggles for each switching cycle. In addition, the pulse width at the output of the comparator 130 is related to the level of RSET. This signal causes the logic block 124 to reduce the switching duty cycle of the transistor switches $Q_1$, $Q_2$, $Q_3$ and $Q_4$ by an amount that is related to the level of RSET. The specified level of RSET can be selected based on the selection of resistor values for $R_{19}$ and $R_{20}$.

To summarize, when the load 110 draws a low level of power, this causes the level of RSET to rise. When the level of RSET exceeds a specified level, the controller enters the third mode of operation, as described above, in which the switching duty cycle of the transistor switches $Q_1$, $Q_2$, $Q_3$ and $Q_4$ is reduced. This mode increases efficiency by reducing switching losses at high switching frequencies.

As shown in FIG. 5, a comparator 132 provides a soft-start feature while a comparator 134 provides for over-voltage protection. For soft-start, a capacitor $C_{18}$ is initially discharged and, then, upon start-up, a current source 136 charges the capacitor $C_{18}$ (FIG. 5). When the voltage on the capacitor $C_{18}$ reaches a specified level (e.g. 1.0 volt), the comparator 132 enables the transistor switches $Q_1$, $Q_2$, $Q_3$ and $Q_4$ to commence switching in a soft-start mode. Also, when the level of the feedback signal VFB exceeds a specified level, the comparator 132 disables switching of the transistor switches $Q_1$, $Q_2$, $Q_3$ and $Q_4$. In addition, an under-voltage lock-out and reference voltage generator 138 generates the reference voltage VREF and disables switching in under-voltage conditions.

In accordance with an embodiment of the power converter 106', upon start-up of the power converter 106', switching of the transistor switches $Q_1$ and $Q_2$ is commenced and, then, after a delay, switching of the transistor switches $Q_3$ and $Q_4$ is commenced. For example, when the voltage on the soft-start capacitor $C_{18}$ reaches a first specified level (e.g. 1.0 volt), the transistor switches $Q_1$ and $Q_2$ may commence switching. Then, when the voltage on the capacitor $C_{18}$ reaches a second specified level, higher than the first (e.g. 5.0 volts), the transistor switches $Q_3$, and $Q_4$ may commence switching. This tends to result in more predictable switching behavior upon start-up. This feature may be implemented, for example, by a comparator that compares the level of the voltage on the capacitor $C_{18}$ to reference voltages of the specified levels and whose output disables/enables the transistor switches $Q_3$ and $Q_4$ via connection to the logic block 124.

In accordance with another embodiment, output current is monitored by a voltage signal ILIM (FIGS. 5 and 6) that is representative of the output current delivered to the load 110. This voltage is sensed by current-sensing resistor R6 (FIG. 4). When the output current exceeds the current limit level, this increases the switching frequency in an effort to limit the level of the output current. Thus, under these conditions, the switching converter 106' functions as a constant current source. This current-limiting feature may be implemented by an amplifier 140 (FIG. 6). As shown in FIG. 6, a non-inverting input of the amplifier 140 is connected to the voltage signal ILIM while an inverting input of the amplifier 140 is connected to a reference voltage level. An output of the amplifier 140 is connected to the input of the voltage-to-current converter 116, which controls switching as described above. The amplifier 140 may be enabled only when the output current exceeds a specified level.

Upon start-up, the output current may initially reach a level that is higher than normal. Therefore, to avoid triggering the current limit during start-up, the current limit level may be initially set to a higher level and then lowered after start-up. For example, when the voltage on the soft-start capacitor $C_{18}$ is below a specified level, e.g. 5.0 volts, the current limit (voltage) level may be set to 1.65 volts. Then, when the voltage on the capacitor $C_{18}$ rises above the specified level, e.g. 5.0 volts, the current limit (voltage) level may be set to 1.0 volt. Increasing the current limit level during start-up tends to result in more predictable behavior upon start-up. This feature may be implemented, for example, by a first comparator that compares the level of the voltage on the capacitor $C_{18}$ to a reference voltage at the specified level (e.g., 5.0 volts) and whose output is used to adjust a reference voltage generator whose output is 1.0 volts when the voltage on the capacitor $C_{18}$ is below 5.0 volts and whose output is 1.65 volts when the voltage on the capacitor $C_{18}$ rises above 5.0 volts. The output of this reference voltage generator may be compared by a second comparator to the signal ILIM where the output of the second comparator is connected to the amplifier 140 to disable/enable the amplifier 140.

As described above, when the current limit is triggered, operation of the switching power converter continues though the output current is limited. In an alternative embodiment, when the current limit is triggered, switching of the power converter may be disabled. In this embodiment, however, the current limit level may be initially set to a higher level and then lowered after start-up, as is also described above. This embodiment may be implemented, for example, by connecting the output of the second comparator described above to the logic block 124 to disable/enable switching.

In accordance with yet another embodiment, the output FEAO of the error amplifier 114 (FIG. 6) is pulled to specified level upon start-up. The output of the amplifier 114 is then allowed to track the output voltage error. More particularly, the output of the amplifier 114 may be forced to its upper rail voltage, e.g. 6.0 volts, upon start-up. This corresponds to a maximum switching frequency and low power output using FM modulation. Then, the maximum switching frequency is reduced and power increased in the feedback loop. This embodiment has an advantage of causing the output voltage $V_O$ to increase gradually and monotonically. This feature may be implemented, for example, by a comparator that compares the level of the voltage on the capacitor $C_{18}$ to a specified level and when the level of the voltage on the capacitor $C_{18}$ is below the specified level, a switch is closed that connects the output of the error amplifier 114 to a reference voltage level. Then, when the level of the voltage on the capacitor $C_{18}$ rises above the specified level, a switch is opened to disconnect the output of the error amplifier 114 from the reference voltage level.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A resonant switching converter comprising:
   a resonant tank having a resonant frequency;
   a synchronous rectifier coupled to the resonant tank, the synchronous rectifier drawing power from the resonant tank for forming an output voltage; and
   a controller coupled to the synchronous rectifier for controlling switching of the synchronous rectifier using frequency modulation, wherein the controller operates in a first mode in which the switching of the synchronous rectifier is performed above the resonant frequency of the resonant tank, the first mode employing a duty cycle for the synchronous rectifier, and wherein the controller operates in a second mode in which the switching of the synchronous rectifier is performed below the resonant frequency and the duty cycle of the synchronous rectifier in the second mode is reduced from that of the first mode.

2. The resonant switching converter according to claim 1, further comprising a switching inverter coupled to the resonant tank for charging the resonant tank with energy wherein the controller controls switching of the switching inverter.

3. The resonant switching converter according to claim 2, wherein switching of the switching inverter is performed at the same frequency as the switching of the synchronous rectifier using frequency modulation and wherein a duty cycle for the switching inverter is the same in both the first mode and the second mode.

4. The resonant switching converter according to claim 3, wherein the duty cycle for the switching inverter is fifty percent in both the first mode and the second mode and wherein the duty cycle for the synchronous rectifier in the first mode is fifty percent.

5. The resonant switching converter according to claim 2, wherein the controller operates in a third mode in which the duty cycle of the synchronous rectifier and the duty cycle of the synchronous rectifier are reduced from that of the first mode and wherein the third mode is entered in response to a light load condition.

6. The resonant switching converter according to claim 5, wherein the light load condition is indicated when the switching frequency exceeds a specified level.

7. The resonant switching converter according to claim 2, wherein upon start-up of the resonant switching converter operation of the switching inverter is commenced immediately and operation of the switching rectifier is commenced only after a delay.

8. The resonant switching converter according to claim 1, wherein the resonant tank comprises an inductor and a capacitor coupled in series to form a series resonant converter.

9. The resonant switching converter according to claim 1, wherein the on-time for switching of the synchronous rectifier in the second mode is constant.

10. The resonant switching converter according to claim 9, wherein the on-time for switching of the synchronous rectifier in the second mode is equivalent to half of the period of the resonant frequency.

11. The resonant switching converter according to claim 1, wherein the on-time for switching of the synchronous rectifier in the second mode is less than half of the period of the resonant frequency.

12. The resonant switching converter according to claim 1, wherein a frequency of switching in the synchronous rectifier is modulated according to a monitored level of the output voltage, thereby, regulating the output voltage in a feedback loop.

13. The resonant switching converter according to claim 1, wherein the duty cycle of the synchronous rectifier is controlled by monitoring current levels in switches of the synchronous rectifier.

14. The resonant switching converter according to claim 1, further comprising a transformer having a primary winding and a secondary winding, the primary winding being coupled to the resonant tank and the secondary winding being coupled to the synchronous rectifier.

15. The resonant switching converter according to claim 1 wherein an output current is monitored and the controller controls switching to reduce the output current when it exceeds a specified level, wherein the specified level is set to a first level upon start-up of the resonant switching converter and, after a delay, the specified level is set to a second level, lower than the first level.

16. The resonant switching converter according to claim 1 wherein switching is controlled in a feedback loop based upon a level of an error signal, the error signal being representative of a difference between the output voltage and a desired level of the output voltage.

17. The resonant switching converter according to claim 16, wherein upon start-up of the resonant switching converter, the error signal is first set to a specified level and then allowed to assume a level that is representative of the difference between the output voltage and the desired level of the output voltage.

18. A controller for a resonant switching converter comprising;
means for generating switching signals for operating a synchronous rectifier to draw power from a resonant tank for forming an output voltage; and means for controlling the switching signals using frequency modulation, wherein the means for controlling operates the synchronous rectifier in a first mode in which the switching of the synchronous rectifier is performed above the resonant frequency of the resonant tank, the first mode employing a duty cycle for the synchronous rectifier, and wherein the means for controlling operates the synchronous rectifier in a second mode in which the switching of the synchronous rectifier is performed below the resonant frequency and wherein the duty cycle of the synchronous rectifier in the second mode is reduced from that of the first mode.

19. The resonant switching converter according to claim 18, wherein the means for generating further generates switching signals for operating a switching inverter coupled to the resonant tank for charging the resonant tank with energy.

20. A method of controlling a resonant switching converter comprising:
operating a synchronous rectifier to draw power from a resonant tank for forming an output voltage; and
controlling switching of the synchronous rectifier using frequency modulation, wherein said controlling comprises operating the synchronous rectifier in a first mode in which the switching of the synchronous rectifier is performed above the resonant frequency of the resonant tank, the first mode employing a duty cycle for the synchronous rectifier, and wherein said controlling comprises operating the synchronous rectifier in a second mode in which the switching of the synchronous rectifier is performed below the resonant frequency and wherein the duty cycle of the synchronous rectifier in the second mode is reduced from that of the first mode.

* * * * *